Aug. 28, 1956 J. ANDY 2,760,227
ADJUSTABLE EXTRUDER HEAD
Filed Aug. 29, 1952 3 Sheets-Sheet 3

INVENTOR.
JOSEPH ANDY
BY
William J. Ruano
ATTORNEY

United States Patent Office 2,760,227
Patented Aug. 28, 1956

2,760,227

ADJUSTABLE EXTRUDER HEAD

Joseph Andy, Washington, Pa., assignor to Andy Bros. Tire Shop, Washington, Pa.

Application August 29, 1952, Serial No. 307,123

2 Claims. (Cl. 18—12)

This invention relates to a tubing or extruding machine, more particularly to a tuber head for an extrusion machine primarily adapted for extruding unvulcanized rubber tread for pneumatic tires.

An outstanding disadvantage of conventional tubers or extruders for the production of tire treads wherein rubber, in plastic condition, is forced under pressure through an extruding die to form a continuous strip is that when it is desired to change the thickness of the strip, it is necessary to stop the machine and change the head to provide a strip of different thickness. Such stoppage of the machine increases manufacturing time and results in loss in production and possible injury to the stock in the machine. Attempts have been made in the past to provide an adjustable die for continuously varying the thickness of the extruded rubber strip while the machine is in operation, but such attempts have not met with success. Adjustments to close tolerances have been extremely difficult or impossible, and wide variations in thickness or variations in the shape or taper of the extruded strip have not been obtainable.

Another outstanding disadvantage of conventional extrusion machines has been the inherent tendency for development of abnormal temperatures at the extrusion die because of the common use in conventional extrusion machines of baffles or chokes which generate extremely high heat as a consequence of abnormal pressures developed by forcing the rubber against the baffles or chokes to effect a change in shape. In an endeavor to resist such abnormal pressures conventional heads have been cast as solid pieces, which are heavy, expensive to manufacture and which prevent escape of heat to the outer surface or to water jackets enveloping the die.

Also, conventional tuber heads are generally of great length in comparison to the width or diameter and tend to build up considerable heat due to the long passage of rubber, from the feed end to the discharge end, of the extruder head. Thus, the rubber, because of forcing through a long passage and being subjected to a spreading action as it is forced up through a baffle or frog will develop enormous pressure and will build up highly dangerous temperatures which may be harmful to the rubber, also it will necessitate the expenditure of greater power for the development of such high pressures in the extrusion process. Also, a churning action generally takes place in the tuber feed-screw which provides screw threaded feeding of the rubber into the tuber head. Such high temperatures in many instances cause partial vulcanization of the rubber compounds as they are passed through the tuber head and also cause high porosity in rubber.

An object of my invention is to provide a tuber head for an extruder for extruding rubber strips, which head is of such construction as to minimize the development of heat and which will require relatively low operating pressures for extrusion.

A more specific object of my invention is to provide, in an extrusion machine, a novel extrusion head of relatively short length having hollow walls which are effectively cooled by a water jacket and which head has a passageway which is devoid of obstructions or choking baffles that develop high temperatures.

Other objects and advantages of my invention will become apparent from a study of the following description taken with the accompanying drawings wherein.

Figure 1:
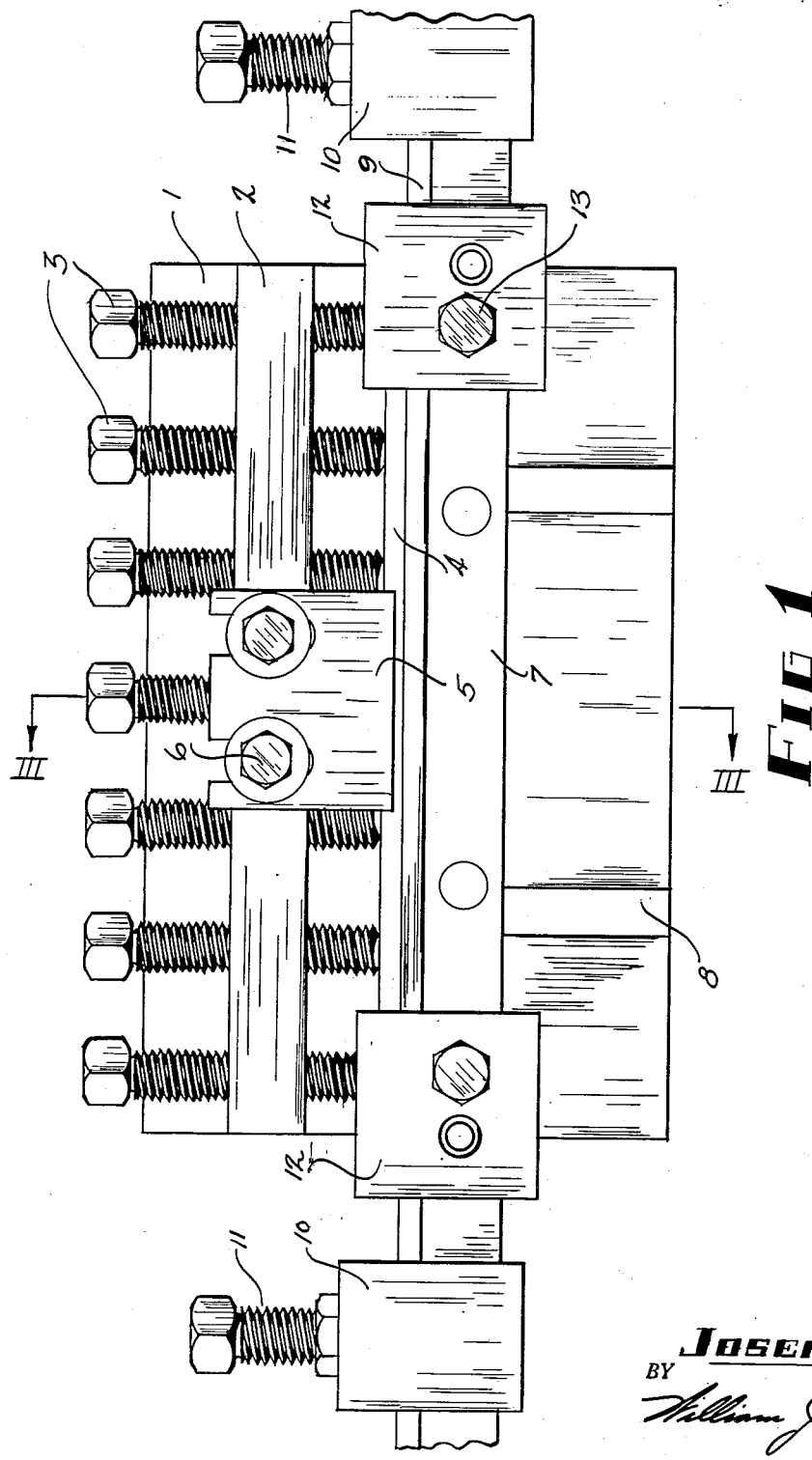
Figure 1 is a front elevational view of an extruder head for an extrusion or tubing machine, which head embodies the principles of my invention.
Figure 2:
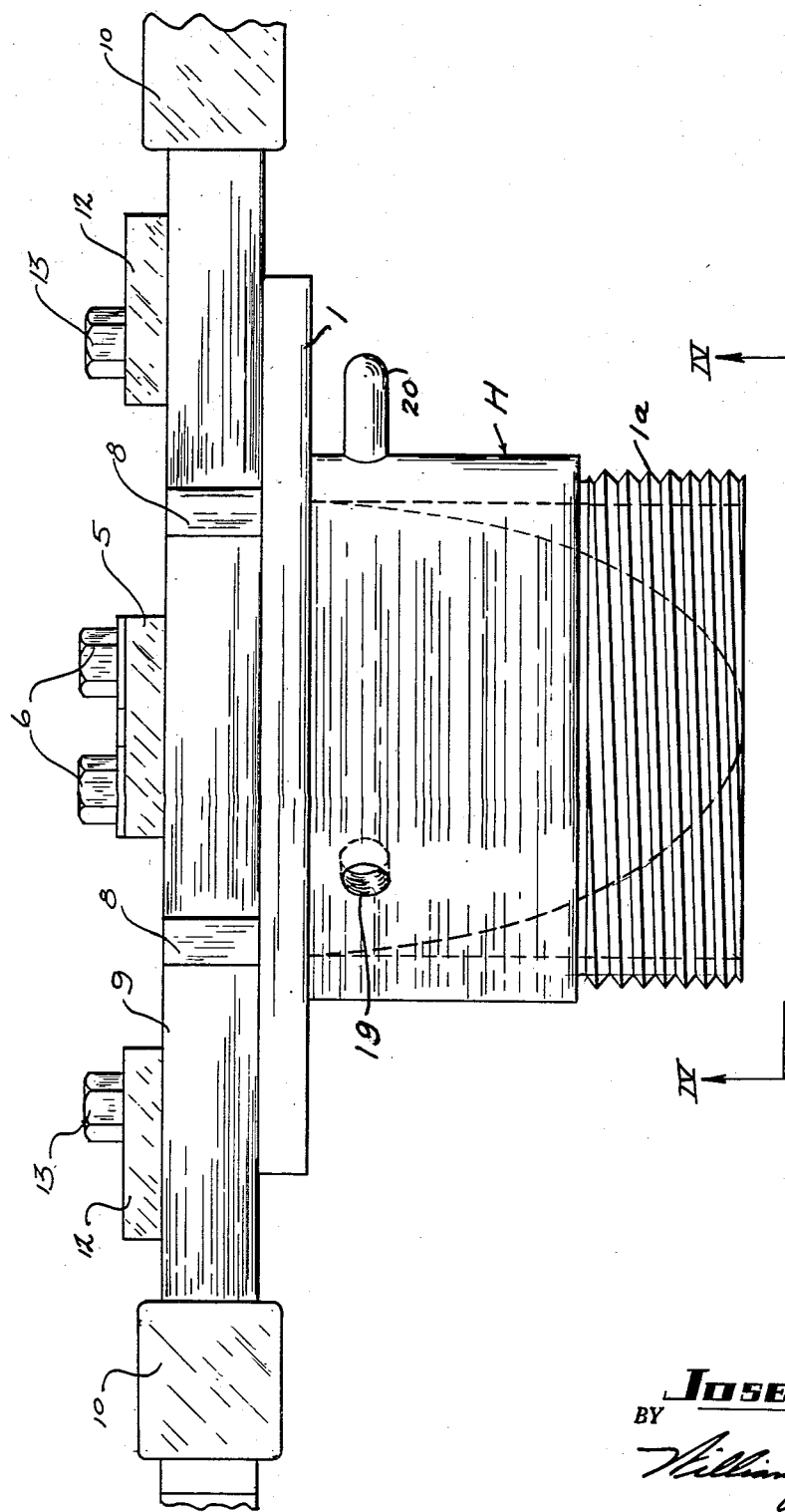
Figure 2 is a bottom view of the extruder or tuber head shown in Figure 1.
Figure 3:
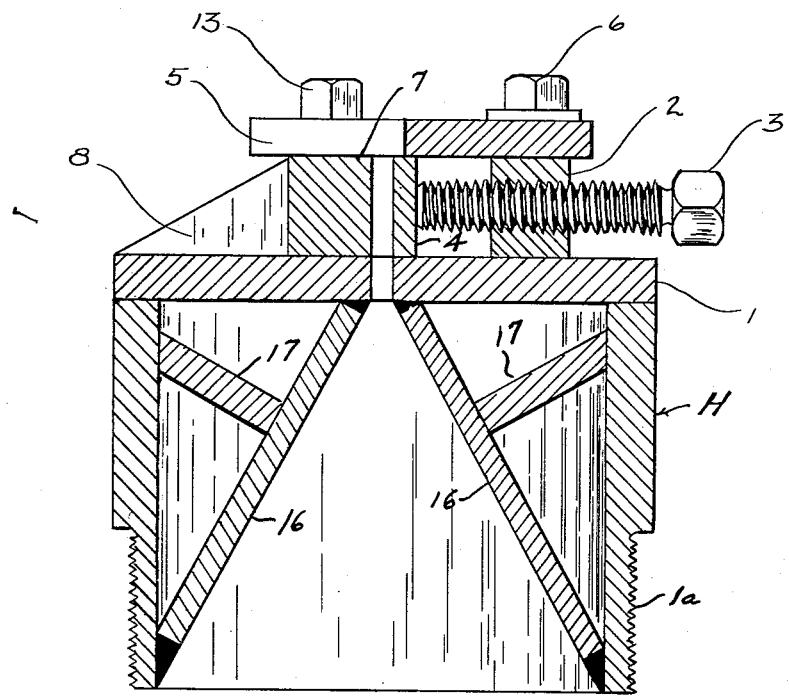
Figure 3 is an enlarged transverse cross sectional view taken along line III—III of Figure 1.

Referring more particularly to Figures 1 and 3, numeral 1 denotes the face plate of a tuber head H which head is of cylindrical construction having a threaded end 1a which is adapted to be screw threadedly engaged in an extruding or tubing machine (not shown). Support bar 2 is integrally secured to the face plate 1 by welding or other suitable means, which bar carries a plurality of adjusting bolts 3 which are in screw threaded engagement therewith for vertically adjusting an adjustable die 4 which is in the form of an elongated strip of metal. Die 4 is restrained against lateral movement by a pressure plate 5 having slots in the top thereof into which are fitted the shanks of bolts 6 which are fastened to support bar 2. Die 4 may be thin and flexible to permit incremental adjustment in thickness along the entire width.

In front of the lower portion of face plate 1 there are provided a plurality of strengthening ribs or supports 8 for rigidly supporting a support bar 7 which is integrally secured to the face plate 1. Supported on support bar 7 is a filler plate 9, the purpose of which is to regulate the width of the extruded strip with some adjustment to the thickness. Filler plate 9 is rigidly held in place by support clamps 10 as the result of tightening down of set screw bolts 11.

Pressure plates 12 are provided for holding the filler plate 9 against lateral movement, and are rigidly held in place by means of bolts 13.

It should be noted that although filler plate 9 is shown in the form of a single strip it may be in the form of two strips of steel wherein the top strip may be slid in or out to govern the desired bevel on the rubber whereas the strip may be slid in or out of its guideway to govern the desired width of the rubber.

In operation it will be apparent that by vertically adjusting the adjusting bolts 3 so as to vertically move adjustable die 4 the thickness of the die or extruded strip may be selectively varied. This variation may be aided by the proper selection of one or more filler plates such as 9. Thus, adjustments in the thickness of the strip may be made at a plurality of points to obtain any desired thickness or taper of extruded rubber without the necessity of stopping the machine.

Another outstanding feature of the invention resides in the construction of the tuber head which is such as to eliminate any tendency for development of high temperature which might cause partial vulcanization or high porosity in the rubber. As will appear more clearly in Figure 3 the baffle plates 16 defining a tapered passageway through the tuber head provides a passageway of relatively short length as compared to the diameter at the feeding end of head H, that is adjacent to screw threaded part 1a. The length of the passageway is comparable in dimension to the diameter at the feed end, and in fact may be somewhat shorter as shown. Baffle plates 16 are welded to the face plate and tuber head cylinder as shown and are of relatively narrow thickness as distinguished from conventional solid walls in well known types of tuber heads. Baffle plates 16 are reinforced by supports or reinforcing plates 17 which span the gap between the baffle plates and the tuber head shell or cylinder so as to permit the baffle plates to withstand high pressures developed. A pipe tap 18 is provided as a water coil inlet and a tap 19, as a water coil outlet. It will be seen that cooling water will enter through pipe tap 18 and will be circulated in the hollow space between lower baffle plate 16 and the tuber cylinder thence will pass through a short by-pass or pipe 20 into the jacket formed between the upper baffle plate 16 and the tuber cylinder, thence outwardly through outlet tap 19 to effectively cool the head and reduce the temperature developed at the die opening through which the rubber strip is extruded.

Figure 4:
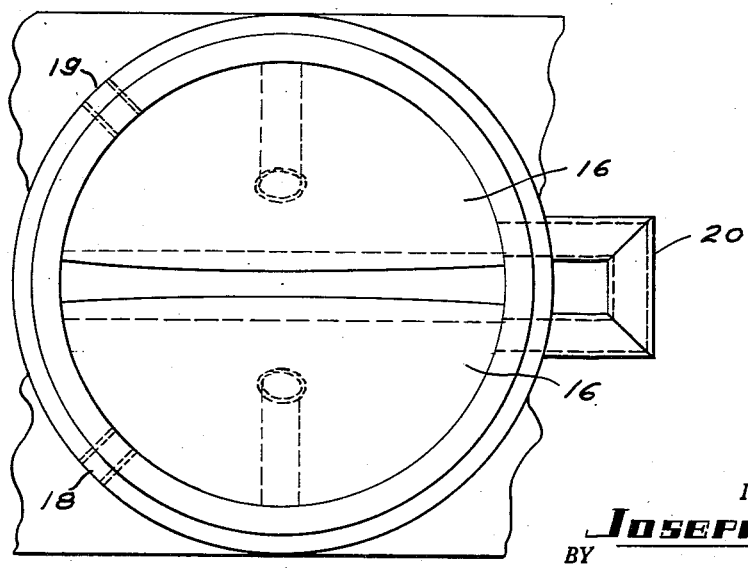
Figure 4 is an enlarged fragmentary rear view taken along lines IV—IV of Figure 2 of the extruder head.

It will be noted particularly on an inspection of Figures 3 and 4 that the rubber as it is forced into and through the passageway formed by baffle plates 16 will not be reduced in width, that is the rubber composition as it enters the tuber head opening adjacent screw threaded part 1a will have a width along the diametrical plane of the die opening comparable to the diameter of the opening and will maintain this width throughout its entire length of travel until it reaches the die opening as will be more clearly observed from a study of Figure 4. Thus, there is no undue constriction or churning of the rubber such as occurs in conventional extruder heads as the rubber compound passes through restricting openings in the head. Hence, no high operating pressure is necessary for screw feeding, nor is there a heavy load thrown on the tuber bearings or motor. And since the rubber is not constrained along its width during its travel through the tuber head, and instead maintains a maximum width throughout, there would be no undue pressures created, hence no abnormal heat developed which would otherwise result in vulcanization or porosity of the rubber. Instead the rubber will be maintained at relatively low temperature particularly with the aid of circulation of cooling liquid through the water jacket formed in the tuber head.

Thus it will be seen that I have provided a novel and efficient tuber head for mounting on an extrusion machine for extruding rubber strips useful as treads on automobile tires, although it should be noted that the invention is of general application for the extrusion of other plastic materials wherein similar problems are confronted; furthermore, I have provided an adjustable die whereby the thickness of the extruded strip may be continuously varied without stopping the extruding machine; furthermore, I have provided an efficient hollow tuber head construction of relatively short length as compared to the width and of a construction such that there is no confinement or reduction in width of the rubber compound in the diametrical plane of the die opening throughout the entire course of its flow through the tapered walls of the tuber head, thereby eliminating the development of abnormally high pressures and temperatures that would cause partial vulcanization, porosity or other harmful effects in the rubber.

While I have illustrated a single embodiment of the invention, it will be noted that this is by way of example only and not by way of limitation since modifications will be readily suggested to those skilled in the art after having had the benefit of the teachings of the present disclosure; hence, the invention should be limited only by the scope of the following claims.

I claim:

1. A tuber head for a rubber extruding machine, said head comprising a holly cylindrical wall, partition means comprising a pair of converging, flat baffle plates; integrally formed within said walls for defining a passageway for converging the rubber in the direction towards the spacing of minimum dimension of the die opening, said passageway having substantially uniform width throughout the entire length thereof comparable to the diameter and length of said tuber head and being devoid of obstructions, whereby there is no restriction along the width of the die opening in the diametrical plane of the die opening during passage of the rubber through the passageway, said head including a cylindrical portion and a face plate, said baffle plates having one end welded to the face plate of the tuber head and the other end welded to said cylindrical portion of the head adjacent the mouth thereof which is normally attached to the extruding machine, said baffle plates forming the inner walls of a water jacket.

2. A tuber head for attachment to an extrusion machine for forming strips of rubber tread for pneumatic tires, said head comprising a hollow cylindrical portion and a face plate closing one end, said face plate having a die opening, the axial length of said tuber head being substantially the same dimension as the diameter of said cylindrical portion, a pair of baffle plates integrally secured inside said cylindrical portion and having ends integrally attached to said face plate adjacent the die opening and to the mouth portion of said cylindrical member whereby no restriction is provided along the diametrical plane of the tuber head which is in registry with said die opening, reinforcing plates secured between said baffle plates and said cylindrical portion, and passageways extending through the space between said baffle plates and said tuber head for the circulation of cooling fluid.

References Cited in the file of this patent

UNITED STATES PATENTS

| | | |
|---|---|---|
| 1,350,722 | Goodenberger | Aug. 24, 1920 |
| 2,022,895 | Morrell | Dec. 3, 1935 |
| 2,047,395 | Stelkens | July 14, 1936 |
| 2,083,557 | Crane et al. | June 15, 1937 |
| 2,154,333 | Kampfer | Apr. 11, 1939 |
| 2,384,521 | Andersen et al. | Sept. 11, 1945 |
| 2,572,677 | Tench | Oct. 23, 1951 |